United States Patent
Carnes et al.

(10) Patent No.: US 6,702,334 B2
(45) Date of Patent: Mar. 9, 2004

(54) TAPERED COMPRESSION RING FOR FLARED TUBE APPLICATIONS

(76) Inventors: Melvin R. Carnes, 21407 Acanthus Way, Santa Clarita, CA (US) 91350; Jeffrey S. Carnes, 1309 E. Wilson Ave., Apt. A, Glendale, CA (US) 91206; Stephen A. Carnes, P.O. Box, Victorville, CA (US) 92392

(*) Notice: Subject to any disclaimer, the term of this patent is extended or adjusted under 35 U.S.C. 154(b) by 0 days.

(21) Appl. No.: 10/108,310

(22) Filed: Mar. 27, 2002

(65) Prior Publication Data
US 2002/0140230 A1 Oct. 3, 2002

Related U.S. Application Data
(60) Provisional application No. 60/279,350, filed on Mar. 28, 2001.

(51) Int. Cl.[7] .................................. F16J 15/00
(52) U.S. Cl. ..................... 285/89; 285/334.5; 411/157; 411/159
(58) Field of Search ..................... 285/89, 334.5; 411/157, 159, 958, 151

(56) References Cited

U.S. PATENT DOCUMENTS

| | | | | |
|---|---|---|---|---|
| 440,870 A | * | 11/1890 | Turnbull | 411/157 |
| 1,025,958 A | * | 5/1912 | Beers | 411/159 |
| 1,800,753 A | * | 4/1931 | Replogle | 285/89 |
| 2,390,103 A | * | 12/1945 | Johnson | 285/89 |
| 4,958,970 A | * | 9/1990 | Rose et al. | 411/12 |

* cited by examiner

*Primary Examiner*—David Bagnell
*Assistant Examiner*—Giovanna Collins
(74) *Attorney, Agent, or Firm*—Timothy Thut Tyson; Ted Masters; Freilich, Hornbaker & Rosen

(57) ABSTRACT

A tapered compression ring for flared tube applications includes a generally ring-shaped body having (a) a gap defining a first end and an opposite second end, (b) a first face, (c) an opposite second face, and (d) a central axis. The first face is tapered at the first end, and the body is twisted so that the first end is offset from the second end along the central axis in a direction away from the first face.

4 Claims, 5 Drawing Sheets

Fig_1 PRIOR ART
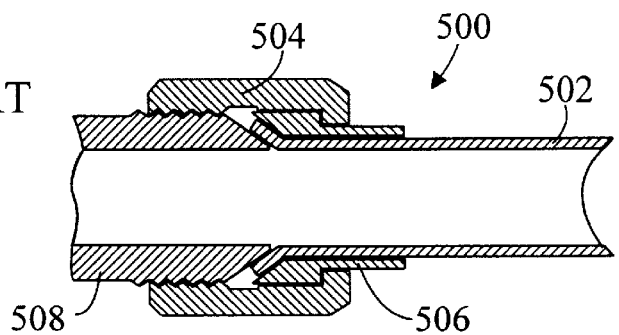
Fig_3 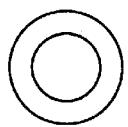 Fig_2 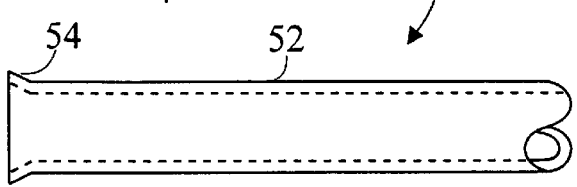 Fig_4 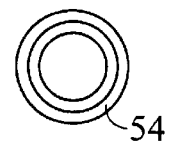
Fig_6 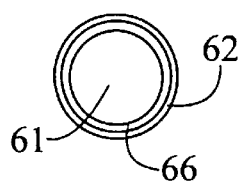 Fig_5 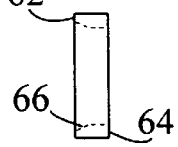 Fig_7 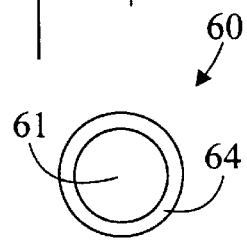

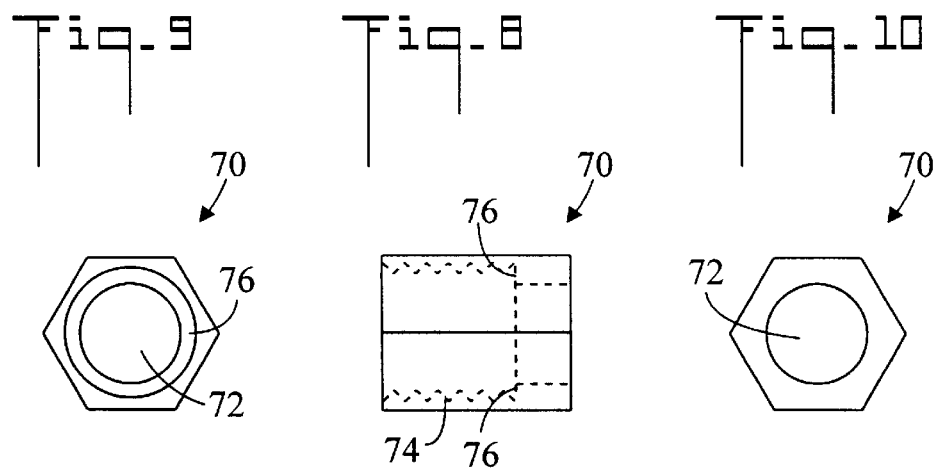
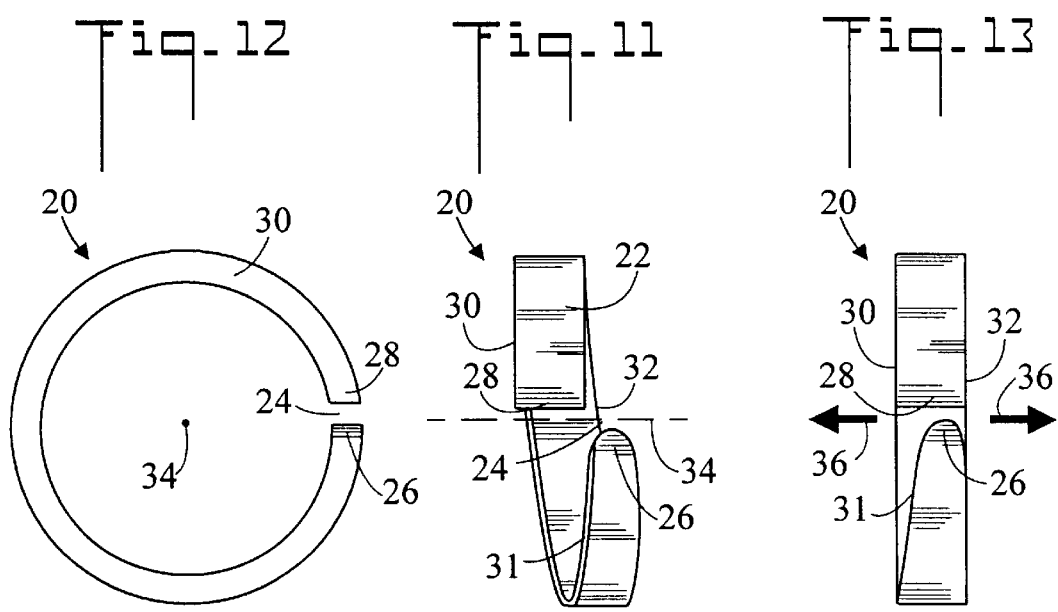

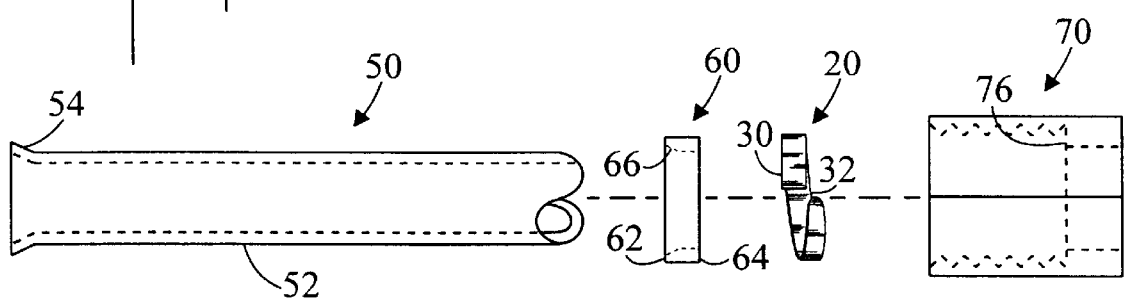
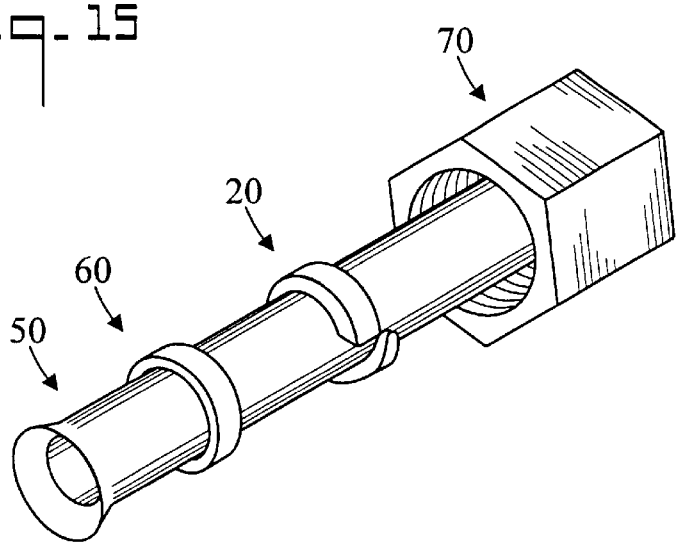

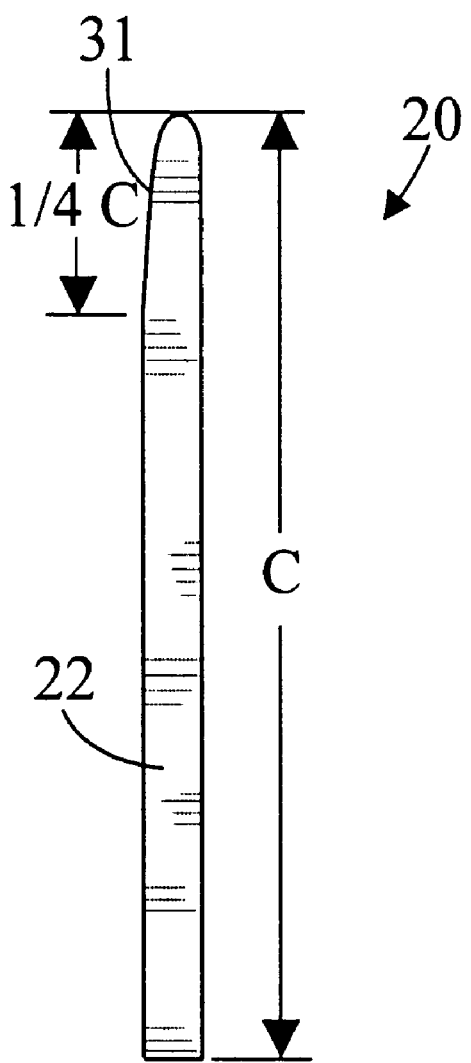
Fig_18

TAPERED COMPRESSION RING FOR FLARED TUBE APPLICATIONS

CROSS REFERENCE TO RELATED APPLICATION

This application claims the filing benefit under 35 U.S.C. §119(e) of U.S. Provisional Application No. 60/279,350, filed Mar. 28, 2001, which is included herein by reference.

TECHNICAL FIELD

The present invention is directed generally to self-locking nut/sleeve assemblies for flared tube applications, and more particularly to a nut/sleeve arrangement which utilizes a tapered compression ring to achieve enhanced loading around the flare fitting.

BACKGROUND OF THE INVENTION

FIG. 1 illustrates a conventional nut and sleeve assembly for flared tube applications (also referred to as a flared tube connecting assembly), generally designated as 500. The assembly consists of flared tube 502, nut 504, and sleeve 506. When pre-loading the nut 504 to a "finger tight" (L1) state, the nut 504 is tightened to a predetermined torque value (L2). As a point of reference, sizes of ½" or less require less than 50° rotation of the nut element when moving from condition L1 to condition L2. This results in approximately <0.008 inches of thread advancement along the lateral centerline. Absent live loading, when subjected to vibration in addition to normal thread stretching and/or differential thermal expansion (DTE), the assembly is robbed of L1 and/or L2 values. Under these conditions, the tendency is for the nut 504 to loosen from the opposing male threaded element 508. The result of this condition is usually a loss of line pressure, leakage of liquids and possible shutdown of the system.

Current attempted fixes for the above noted conditions involve a variety of temporary solutions such as (1) the application of various "dope" compounds to the threads of the nut, with the attendant possibility of contamination of the medium being transferred through the lines, (2) the application of lock wire devices, which must be monitored closely in order to eliminate the possibility of F.O.D. damage to the operating system, and (3) external clamping devices which are cumbersome and may require special application tools.

In view of the above, the present methods for securing an ordinary nut sleeve assembly as shown in FIG. 1 have not proven satisfactory in either form, fit, or function.

SUMMARY OF THE INVENTION

The present invention is directed to a self-locking nut/sleeve assembly which overcomes the disadvantages of the aforementioned devices in a practical and economical manner. The present invention includes a "live loading" feature which is provided by a compression ring which is tapered at one end. The present invention requires a greater amount of rotation to go from an L1 to an L2 state than does a conventional nut/sleeve assembly. Additionally, the tapered compression ring results in a load that is more evenly delivered to the flared end of the tube. The present invention has the following additional advantages:

multiple connect/disconnect capability no special tools required no "locking compounds" required no lockwires required available in sizes ranging from ¼" to 3.0"in 0.062" increments built from readily available materials constant live (compressive) loading of the nut assembly In accordance with a preferred embodiment of the invention, a tapered compression ring has a generally ring-shaped body having (a) a gap or cut which defines a first end and an opposite second end, (b) a first face, (c) an opposite second face, and (d) a central axis. The first face is tapered toward the first end, and the body is twisted so that the first end is displaced from the second end along the central axis in a direction away from the first face.

In accordance with an important aspect of the invention, the first end is rounded.

In accordance with an important feature of the invention, the taper extends around about one quarter of the circumference of the tapered compression ring.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a cross sectional view of a prior art conventional nut and sleeve assembly for flared tube applications;

FIG. 2 is a side elevation view of a flared tube;

FIG. 3 is and end elevation view of the flared tube;

FIG. 4 is an opposite end elevation view of the flared tube;

FIG. 5 is a side elevation view of a sleeve ring;

FIG. 6 is an end elevation view of the sleeve ring;

FIG. 7 is an opposite end elevation view of the sleeve ring;

FIG. 8 is a side elevation view of a binder nut;

FIG. 9 is an end elevation view of the binder nut;

FIG. 10 is an opposite end elevation view of the binder nut;

FIG. 11 is a enlarged side elevation view of a tapered compression ring in accordance with the present invention;

FIG. 12 is an enlarged end elevation view of the tapered compression ring;

FIG. 13 is a side elevation view of the tapered compression ring in a compressed state;

FIG. 14 is an exploded side elevation view of the flared tube, sleeve ring, tapered compression ring, and binder nut;

FIG. 15 is perspective view of sleeve ring, tapered compression ring, and binder nut installed on the flared tube.

DETAILED DESCRIPTION OF THE INVENTION

Figure 16:
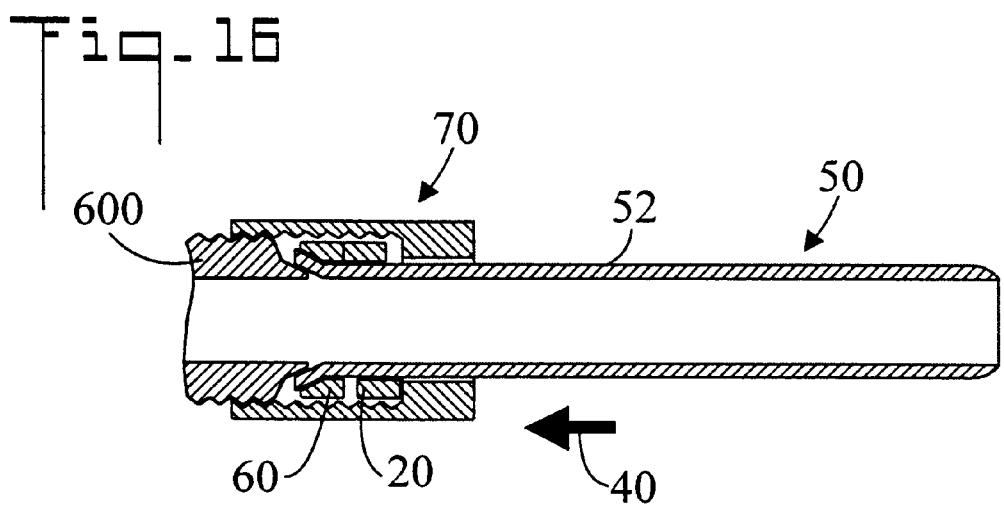
FIG. 16 is a cross sectional view of a flared tube connecting assembly in a finger-tight state.

Referring initially to FIGS. 2–4, there are illustrated side elevation, end elevation, and opposite end elevation views respectively of a flared tube 50, consisting of a tube 52 having a flared end 54. In a typical application, flared tube 50 contains high pressure fluid.

Referring now to FIGS. 5–7, there are illustrated side elevation, end elevation, and opposite end elevation views respectively of a sleeve ring 60. Sleeve ring 60 comprises a ring-shaped member which has a hole 61 shaped and dimensioned to snugly accept tube 52 of flared tube 50. Sleeve ring 60 has a first face 62 and an opposite second face 64. Sleeve ring 60 has an internal bevel 66 at first face 62. As will be discussed later, bevel 66 abuts flared end 54 of flared tube 50.

Referring now to FIGS. 8–10, there are illustrated side elevation, end elevation, and opposite end elevation views respectively of a binder nut 70. Binder nut 70 has a hole 72 to accept tube 52 of flared tube 50. Binder nut 70 has internal female threads 74 and an end wall 76.

Referring now to FIGS. 11–12, there are illustrated side elevation and end elevation views respectively of a tapered compression ring in accordance with the present invention, generally designated as 20. Tapered compression ring 20 has a generally ring-shaped body 22 having (a) a gap 24 defining a first end 26 and an opposite second end 28, (b) a first face 30, (c) an opposite second face 32, and (d) a central axis 34. First face 30 is uniformly tapered 31 from first end 26 (refer also to FIGS. 13 and 18) extending for about one-quarter of the circumference of ring 20. Body 22 is twisted so that first end 26 is offset (moved to the right in the FIG.) from second end 28 along central axis 34 in a direction away from first face 30. The twisted configuration serves to store energy when tapered compression ring 20 is compressed. It is further noted that first end 26 is rounded.

Figure 17:
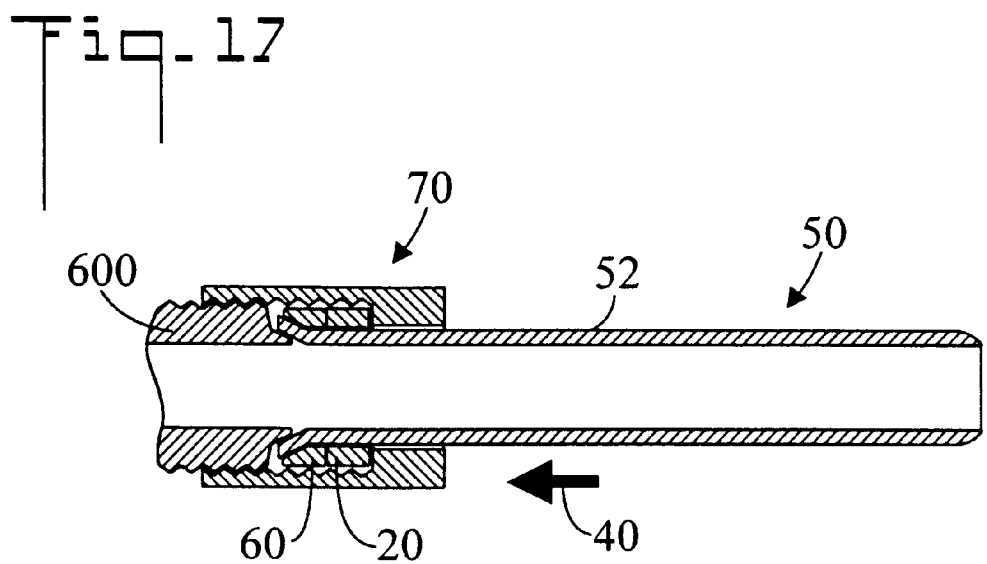
FIG. 17 is a cross sectional view of the flared tube connecting assembly in a tightened state; and, FIG. 18 is a flattened view of the tapered compression ring.

FIG. 13 is a side elevation view of tapered compression ring 20 in a compressed state. Referring also to FIG. 17, tapered compression ring 20 has been compressed between sleeve ring 60 (against first face 30) and end wall 76 of binder nut 70 (against second face 32). In the compressed state, tapered compression ring 20 exerts outward force in directions 36.

FIG. 14 is an exploded side elevation view of flared tube 50, sleeve ring 60, tapered compression ring 20, and binder nut 70, combined to form a flared tube connecting assembly. First sleeve ring 60 is placed around tube 52 of flared tube 50. Sleeve ring 60 is oriented so that bevel 66 faces flared end 54 of flared tube 50. Next tapered compression ring 20 is placed around tube 52 of flared tube 50, so that first face 30 is toward sleeve ring 60. Finally, binder nut 70 is placed around tube 52 of flared tube 50.

FIG. 15 is perspective view of sleeve ring 60, tapered compression ring 20, and binder nut 70 installed on flared tube 50.

FIG. 16 is a cross sectional view of a flared tube connecting assembly in a finger-tight (L1) state. Sleeve ring 60, tapered compression ring 20, and binder nut 70 have been installed on flared tube 50. The assembly has then been mated with an opposing threaded element 600 wherein the female threads 74 of binder nut 70 engage male threads of the opposing threaded element 600. Binder nut 70 has been turned in direction 40 to a "finger tight" L1 condition FIG. 17 is a cross sectional view of the flared tube connecting assembly in a tightened (L2) state. Binder nut has been turned in direction 40 to a pre-determined torque value. In this condition, (1) sleeve ring 60 receives flared tube 50 so that bevel 66 of sleeve ring 60 abuts flared end 54 of flared tube 50, (2) tapered compression ring 20 receives flared tube 50 so that first face 30 of tapered compression ring 20 abuts second face 64 of sleeve ring 60, and (3) binder nut 70 receives flared tube 50 so that second face 32 of tapered compression ring 20 abuts end wall 74 of binder nut 70 (refer also to FIG. 14).

When compressed by screwing down binder nut 70, tapered compression ring 20 exerts force upon (1) sleeve ring 60 which in turn exerts force upon tapered end 54 of flared tube 50, and (2) end wall 76 of binder nut 70. Tapered compression ring 20 allows the "stored energy" within the ring to dissipate more rapidly around the circumference of sleeve ring 60. This allows the bearing surface between sleeve ring 60 and flared end 54 to be loaded more evenly.

Unlike present nut/sleeve assemblies, tightening the nut from L1 to L2 in the present invention (1) requires more rotation (about 180°–200° in a preferred embodiment) as compared to less than 50° in the present device, (2) produces a thread advancement along the lateral centerline of approximately ½ full thread on any given fitting size as compared to approximately 0.008 inches of thread advancement along the lateral centerline of the present design, and (3) maintains a constant resistance load (live loading) on binder nut 70 from L1 through L2, and from L2 back down to L1, as when removing binder nut 70 from the opposing element for maintenance of the system. Present nut assemblies do not provide for a resistance load (live load) to binder nut 70 when it is loosened.

As binder nut 70 is tightened from the L1 condition to the L2 condition the opposing element is always stretched toward binder nut 70. When the system is put into operation, because of individual part configurations, differential thermal expansion (DTE) is introduced into the fitting. These cycles of expansion and return to ambient temperature of each fitting element would, without the binder nut 70/tapered compression ring 20, and sleeve ring 60, rob the assembly of L1 and/or L2 values.

The design of the present invention with live loading will reduce effects on L1 and L2 by absorbing the effects of DTE, elastic or stretching interactions and system vibration. Reducing these effects, allow joint loading curves to be maintained at pre-determined L1 and L2 values.

FIG. 18 is a flattened view of tapered compression ring 20 showing taper 31. In a preferred embodiment of the present invention, body 22 of tapered compression ring 20 has a circumference C, and taper 31 extends uniformly for about one-quarter of circumference C as shown in FIG. 18. It may be appreciated that the amount of taper can vary for specific applications.

The preferred embodiments of the invention described herein are exemplary and numerous modifications, dimensional variations, and rearrangements can be readily envisioned to achieve an equivalent result, all of which are intended to be embraced within the scope of the appended claims.

We claim:

1. A tapered compression ring, comprising:

a generally ring-shaped body having (a) a gap defining a first end and an opposite second end, (b) a first face, (C) an opposite substantially flat second face, (d) a central axis, and (e) a circumference;

said first face uniformly tapered from said first end extending for about one-quarter of said circumference; and, when in an uncompressed state, said body twisted so that said first end is offset from said second end along said central axis in a direction away from said first face.

2. A tapered compression ring according to claim 1, further including:

said first end rounded.

3. A flared tube connecting assembly, comprising:

a tube having a flared end;

a sleeve ring having a first face and an opposite second face, said sleeve ring having an internal bevel at said first face;

a tapered compression ring having a generally ring-shaped body having (a) a gap defining a first end and an opposite second end, (b) a first face, (c) an opposite substantially flat second face (d) a central axis, and (e) a circumference, said first face uniformly tapered from said first end extending for about one-quarter of said circumference, and when in an uncompressed state said body twisted so that said first end is offset from said second end along said central axis in a direction away from said first face;

a binder nut having an end wall;

wherein said sleeve ring receives said flared tube so that said bevel of said sleeve ring abuts said flared end of said flared tube, said tapered compression ring receives said flared tube so that said first face of said tapered compression ring abuts said second face of said sleeve ring, and said binder nut receives said flared tube so that said second face of said tapered compression ring abuts said end wall of said binder nut.

4. A tapered compression ring, comprising:

a generally ring-shaped body having (a) a gap defining a first end and an opposite second end, (b) a first face, (c) an opposite substantially flat second face, (d) a central axis, and (e) a circumference;

said first face uniformly tapered from said first end extending for about one-quarter of said circumference; and said first and second faces not tapered at said second end; and, when in an uncompressed state, said body twisted so that said first end is offset from said second end along central axis in direction away from said first face.

* * * * *